(12) United States Patent
Xiao et al.

(10) Patent No.: US 12,240,670 B2
(45) Date of Patent: Mar. 4, 2025

(54) SEALING BOX AND STANDING DEVICE

(71) Applicant: WUXI LEAD INTELLIGENT EQUIPMENT CO., LTD., Jiangsu (CN)

(72) Inventors: Jianglian Xiao, Jiangsu (CN); Yizhou Sun, Jiangsu (CN)

(73) Assignee: Wuxi Lead Intelligent Equipment Co., Ltd., Jiangsu (CN)

( * ) Notice: Subject to any disclaimer, the term of this patent is extended or adjusted under 35 U.S.C. 154(b) by 0 days.

(21) Appl. No.: 18/649,440

(22) Filed: Apr. 29, 2024

(65) Prior Publication Data

US 2024/0278964 A1 Aug. 22, 2024

Related U.S. Application Data

(63) Continuation of application No. PCT/CN2021/135143, filed on Dec. 2, 2021.

(30) Foreign Application Priority Data

Mar. 9, 2021 (CN) .......................... 202110254674.4

(51) Int. Cl.
*B65D 53/06* (2006.01)
*H01M 50/184* (2021.01)

(52) U.S. Cl.
CPC .......... *B65D 53/06* (2013.01); *H01M 50/184* (2021.01)

(58) Field of Classification Search
CPC .......................... B65D 53/06; H01M 50/184
See application file for complete search history.

(56) References Cited

U.S. PATENT DOCUMENTS

| | | | | |
|---|---|---|---|---|
| 3,976,556 A | * | 8/1976 | De Nora | ................... C25B 9/70 |
| | | | | 204/266 |
| 2005/0012281 A1 | * | 1/2005 | Ludwig | ..................... A61L 2/26 |
| | | | | 277/646 |

FOREIGN PATENT DOCUMENTS

CN 110259945 A 9/2019

* cited by examiner

*Primary Examiner* — James N Smalley
(74) *Attorney, Agent, or Firm* — Baker Botts LLP

(57) ABSTRACT

A sealing box and a standing device are disclosed. The sealing box includes an upper cover; a lower cover which is detachably connected to the upper cover and encloses with the upper cover to form an accommodating chamber, and defines a sealing groove toward the upper cover and an inflation hole capable of inflating airflow into the sealing groove; and an elastic sealing ring which includes a sealing end sealedly contacting the upper cover and a deformation end extending into the sealing groove. The deformation end is deformed under force of the airflow and squeezes the sealing groove, so as to apply a force to the lower cover toward the upper cover.

9 Claims, 3 Drawing Sheets

SEALING BOX AND STANDING DEVICE

CROSS-REFERENCE TO RELATED APPLICATIONS

The present application is a National Stage of International Application No. PCT/CN2021/135143, filed on Dec. 2, 2021, which claims priority to Chinese application No. 202110254674.4, filed on Mar. 9, 2021, titled "SEALING BOX AND STANDING DEVICE", both of which are hereby incorporated by reference in their entireties.

FIELD OF INVENTION

The present application relates to a field of battery manufacturing, and especially to a sealing box and a standing device.

BACKGROUND OF INVENTION

Lithium battery is a kind of green energy with advantages of high working voltage, large capacity density, long cycle life, no memory effect, etc. It has been widely used in various industries, especially in recent years, and electric vehicles have been greatly developed.

Liquid filling is an important process in production of the lithium battery, which directly affects a performance of the battery. In order to ensure that electrolytes filled into the battery rapidly infiltrate, it is necessary to place the battery after liquid injection in a sealing box, and pressurize (i.e., inflate) or extract (vacuumize) into the sealing box during a standing process. When inflating into the sealing box, it will put a downward pressure on a lower cover of the sealing box, thus affecting sealability between the lower cover and a box body, resulting in difficult pressurization and affecting a standing effect.

SUMMARY OF INVENTION

Based on this, it is necessary to provide a sealing box and a standing device to improve the above defects, aiming at problems of difficult pressurization and a poor standing effect of the standing device in the prior art.

In order to solve the above technical problems, a technical solution adopted in the present application is to provide a sealing box, includes:
  an upper cover;
  a lower cover, detachably connected to the upper cover, and enclosing with the upper cover to form an accommodating chamber for accommodating a workpiece; one side of the lower cover toward the upper cover defining a sealing groove surrounding the accommodating chamber; and
  an elastic sealing ring, sealedly disposed in the sealing groove, and including a sealing end sealedly contacting the upper cover and a deformation end accommodated into the sealing groove;
  wherein the lower cover defines an inflation hole communicated with the sealing groove, the deformation end is deformed under action of airflow inflated into the sealing groove by the inflation hole, squeezes groove walls of the sealing groove and generates a force to push the sealing end to move toward the upper cover.

In an embodiment, the deformation end defines a recess, and the deformation end includes two elastic portions on both sides of the recess. The inflation hole is arranged toward the recess. The two elastic portions fit closely against the groove walls of the sealing groove under the action of the airflow inflated into the recess by the inflation hole.

In an embodiment, portions of the elastic sealing ring accommodated in the sealing groove fit against the groove walls of the sealing groove.

In order to solve the above technical problems, a technical solution adopted in the present application is to provide a standing device, includes a support frame, a plurality of transverse support plates, a plurality of clamping jaw assemblies, and a sealing box as described in any one of the above embodiments; the plurality of the transverse support plates are fixedly connected to the support frame and enclose to form a holding position for accommodating the upper cover and the lower cover, and each of the transverse support plates is provided with at least one of the clamping jaw assemblies;
  each clamping jaw assembly is used for clamping the upper cover and the lower cover in the holding position.

In an embodiment, each clamping jaw assembly includes a mounting frame, clamping jaws, and a driving member, the mounting frame is disposed on the transverse support plate, the clamping jaws can be connected to the mounting frame toward the holding position and in a manner of being close to or far away from the holding position, and the driving member is in transmission connection with the clamping jaws.

In an embodiment, each clamping jaw assembly also includes floating structures, the floating structures are disposed on the transverse support plate and have floating ends that can float in a first direction perpendicular to a moving direction of the clamping jaws under action of an external force;
  the mounting frame is fixedly connected to the floating ends.

In an embodiment, each transverse support plate defines guide holes that pass through the transverse support plate in the first direction;
  each floating structure includes a guide post, an elastic member, and a limiting member, the guide post is arranged through the corresponding guide hole, and one end of the guide post is used as the floating end and is fixedly connected to the mounting frame, another end of the guide post is in transmission connection with the limiting member, and the elastic member is butted between the limiting member and the transverse support plate.

In an embodiment, each clamping jaw assembly further includes a sliding plate, the clamping jaws are fixedly connected to the sliding plate, and the sliding plate is provided with sliding rails;
  the mounting frame is provided with sliding blocks, and the sliding blocks are slidably mated with the sliding rails;
  the driving member is fixedly installed on the sliding plate, and a driving end of the driving member is connected to the mounting frame.

In an embodiment, a plurality of the clamping jaws are fixedly connected on the sliding plate of each clamping jaw assembly.

In an embodiment, the upper cover and the lower cover are provided with anti-wear gaskets corresponding to positions of the clamping jaws.

The lower cover and the upper cover of the sealing box and the standing device are detachably connected to form an accommodating chamber. The battery after liquid injection is placed in the accommodating chamber for standing so that electrolytes can be fully soaked. In a standing process, inert gas can be inflated into the accommodating chamber to increase pressure in the accommodating chamber, so that the battery is in a high-pressure environment, which is conducive to improving an infiltration rate.

However, in a process of inflating and pressurizing the accommodating chamber, a first pressure away from the upper cover is applied to the lower cover under action of air pressure. In order to prevent the first pressure from affecting sealability between the lower cover and the upper cover, the inflation hole on the lower cover can be used to inflate air into the sealing groove, so that the deformation end of the elastic sealing ring is deformed and squeeze the groove walls of the sealing groove (that is, the deformed end fits closely against the groove walls of the sealing groove), and at the same time, a force is generated to push the sealing end to move toward the upper cover, so as to eliminate an influence of the first pressure on the sealability, and ensure that the sealability between the upper cover and the lower cover is not damaged.

DETAILED DESCRIPTION OF PREFERRED EMBODIMENTS

The present application provides a sealing box and a standing device. In order to make the objects, the technical solutions, and the effects of the present application more clear and definite, the present application is further described in detail below concerning the drawings and embodiments. It should be understood that the specific embodiments described herein are only used to explain the present application, not to define the present application.

Figure 1:
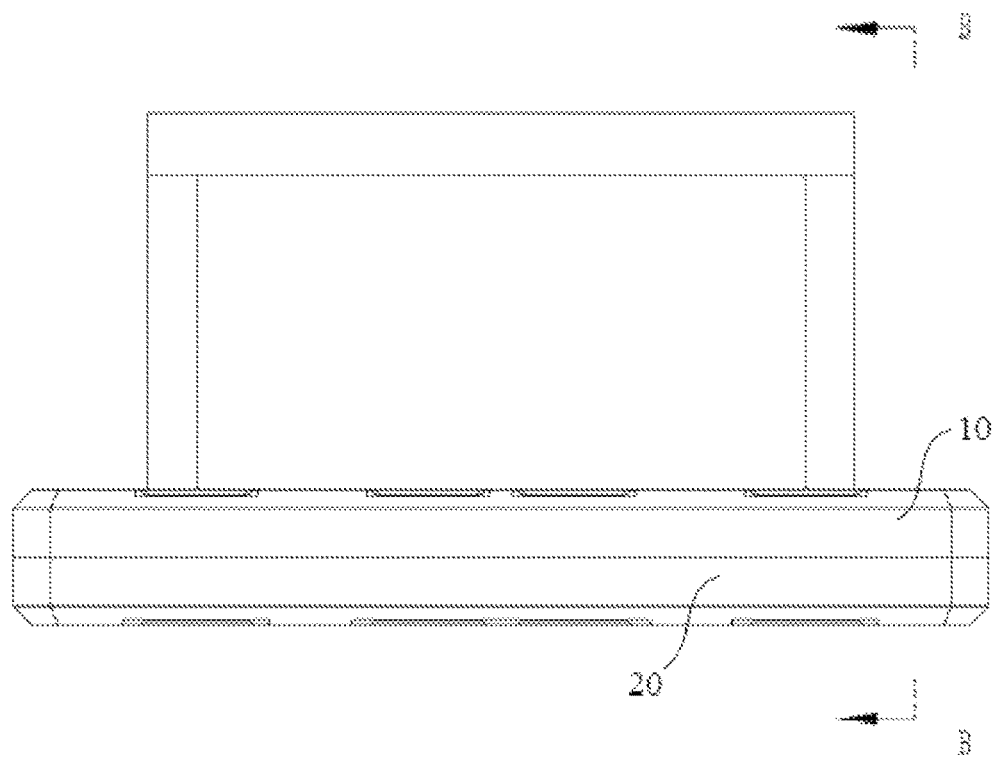
FIG. 1 is a schematic structural view of a sealing box in an embodiment of the present application.
Figure 2:
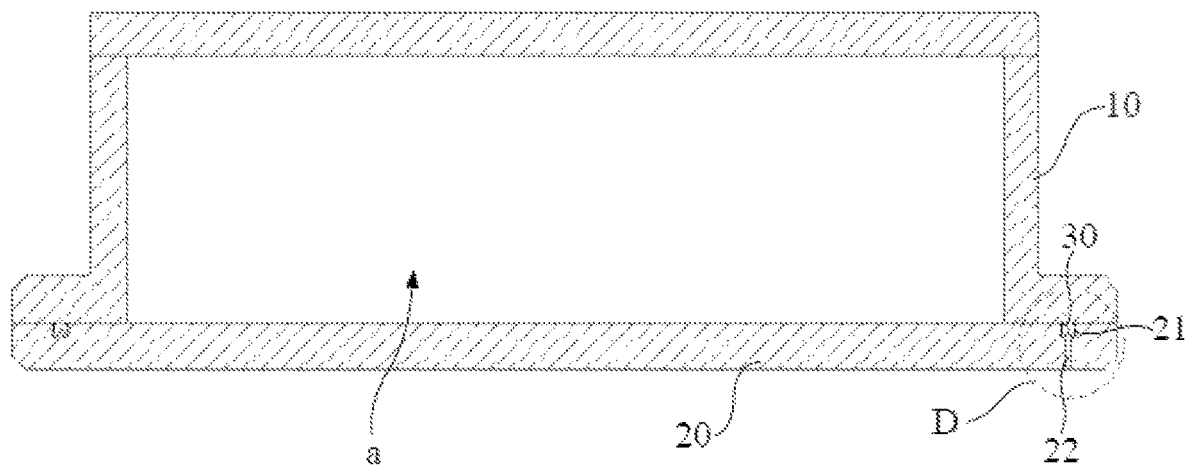
FIG. 2 is a cross-sectional view along B-B direction in FIG. 1.
Figure 3:
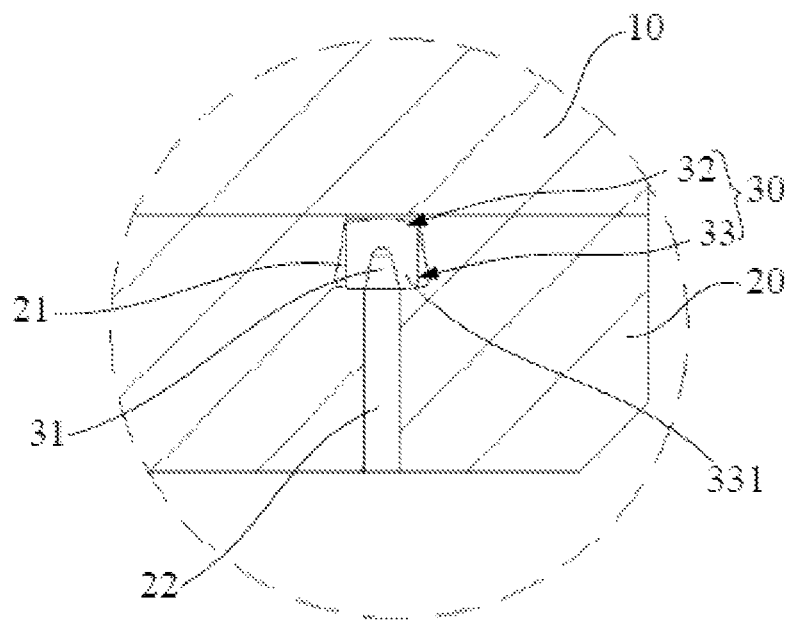
FIG. 3 is an enlarged partial view of FIG. 2 at D.

As shown in FIG. 1, FIG. 2, and FIG. 3, a sealing box provided in an embodiment of the present application includes an upper cover 10, a lower cover 20, and an elastic sealing ring 30. The lower cover 20 is detachably connected to the upper cover 10 and encloses with the upper cover 10 to form an accommodating chamber a for accommodating a workpiece. One side of the lower cover 20 toward the upper cover 10 defines a sealing groove 21 surrounding the accommodating chamber a, the elastic sealing ring 30 is disposed in the sealing groove 21 for sealing a gap between the upper cover 10 and the lower cover 20. The elastic sealing ring 30 includes a sealing end 32 sealedly contacting the upper cover 10 and a deformation end 33 accommodated into the sealing groove 21. Optionally, the workpiece can be a battery that needs to be kept standing, or another product that needs to be kept in the accommodating chamber a, which is not limited here. For easy understanding, the battery is described herein as an example.

Wherein the lower cover 20 defines an inflation hole 22 communicated with the sealing groove 21, the deformation end 33 is deformed under action of airflow inflated into the sealing groove 21 by the inflation hole 22, squeezes groove walls of the sealing groove 21, and generates a force to push the sealing end 32 of the sealing ring 30 to move toward the upper cover 10 so as to keep the deformation end 33 fitting closely against the groove walls of the seal groove 21 and the sealing end 32 fitting closely against the upper cover 10, so that the elastic sealing ring 30 seals the gap between the upper cover 10 and the lower cover 20.

For the sealing box, the lower cover 20 and the upper cover 10 can be detachably connected to form the accommodating chamber a, the battery after liquid injection is placed in the accommodating chamber a for standing so that electrolytes can be fully soaked. In a standing process, inert gas can be inflated into the accommodating chamber a to increase pressure in the accommodating chamber a, so that the battery is in a high-pressure environment, which is conducive to improving a soaking rate.

However, in a process of inflating and pressurizing to the accommodating chamber a, a first pressure away from the upper cover 10 is applied to the lower cover 20 under action of air pressure. In order to prevent the first pressure from affecting sealability between the lower cover 20 and the upper cover 10, the inflation hole 22 on the lower cover 20 can be used to inflate air into the sealing groove 21, so that the deformation end 33 of the elastic sealing ring 30 is deformed and squeeze the groove walls of the sealing groove 21 (that is, the deformation end 33 fits closely against the groove walls of the sealing groove 21), and at the same time, a force is generated to push the sealing end 32 to move toward the upper cover 10, so as to eliminate an influence of the first pressure on the sealability and ensure that the sealability between the upper cover 10 and the lower cover 20 is not damaged.

It can be understood that in order to inflate to the accommodating chamber a, the upper cover 10 or the lower cover 20 can define an air hole communicating with the accommodating chamber a, the air hole is communicated with an external air source so that the external air source can be used to inflate the inert gas into the accommodating chamber a.

Specifically, in an embodiment, a side of the lower cover 20 toward the accommodating chamber a has a fixed position for fixing the battery. In this way, the battery after liquid injection is fixed on the fixed position of the lower cover 20, and the lower cover 20 is then covered and connected to the upper cover 10 so that the battery stands in accommodating chamber a. After standing of the battery is completed, the lower cover 20 is separated from the upper cover 10, and then the battery is removed from the lower cover 20.

Specifically, in an embodiment, the deformation end 33 defines a recess 31, and the deformation end 33 includes two elastic portions 331, the two elastic portions 331 are located on both sides of the recess 31. The inflation hole 22 is arranged toward the recess 31 so that airflow inflated by the inflation hole 22 enters the recess 31. The two elastic portions 331 are deformed in a direction far away from each other under action of the airflow inflated into the recess 31 by the inflation hole 22, and fit closely against the groove walls of the sealing groove 21. At the same time, a force is generated to push the sealing end 32 to move toward the upper cover 10, so as to eliminate an influence of the first pressure on the sealability between the upper cover 10 and the lower cover 20 and avoid damaging the sealability between the upper cover 10 and the lower cover 20 under the action of the first pressure.

Specifically, in an embodiment, portions of the elastic sealing ring 30 accommodated in the sealing groove 21 fit against the groove walls of the sealing groove 21. The sealing end 32 of the elastic sealing ring 30 fits against the upper cover 10. In this way, in an initial state (that is, when the sealing groove 21 is not inflated), since the portions of the elastic sealing ring 30 accommodated in the sealing groove 21 (including the deformation end 33) fit against the groove walls of the sealing groove 21, and the sealing end 32 of the elastic sealing ring 30 fits against the upper cover 10 so that a sealing effect is achieved. When the airflow is inflated to the sealing groove 21, the portions of the elastic sealing ring 30 accommodated in the sealing groove 21 fit more closely against the groove walls of the sealing groove 21, further improving the sealing effect.

As shown in FIG. 3, in an embodiment of the present application, the sealing groove 21 is enclosed by the two groove walls and a bottom wall connected between the two groove walls. The recess 31 of the deformation end 33 is arranged toward the bottom wall, and one end of the inflation hole 22 passes through the bottom wall of the sealing groove 21, so that the airflow inflated by the air inflation hole 22 can enter the recess 31, and then the two elastic portions 331 of the deformation end 33 are deformed in the direction away from each other, so that they fit closely against the corresponding two groove walls. Another end of the inflation hole 22 passes through a side of the lower cover 20 away from the upper cover 10, so as to facilitate connection with the external air source.

Based on the above sealing box, the present application also provides a standing device, including the sealing box described in any previous embodiment.

Figure 5:
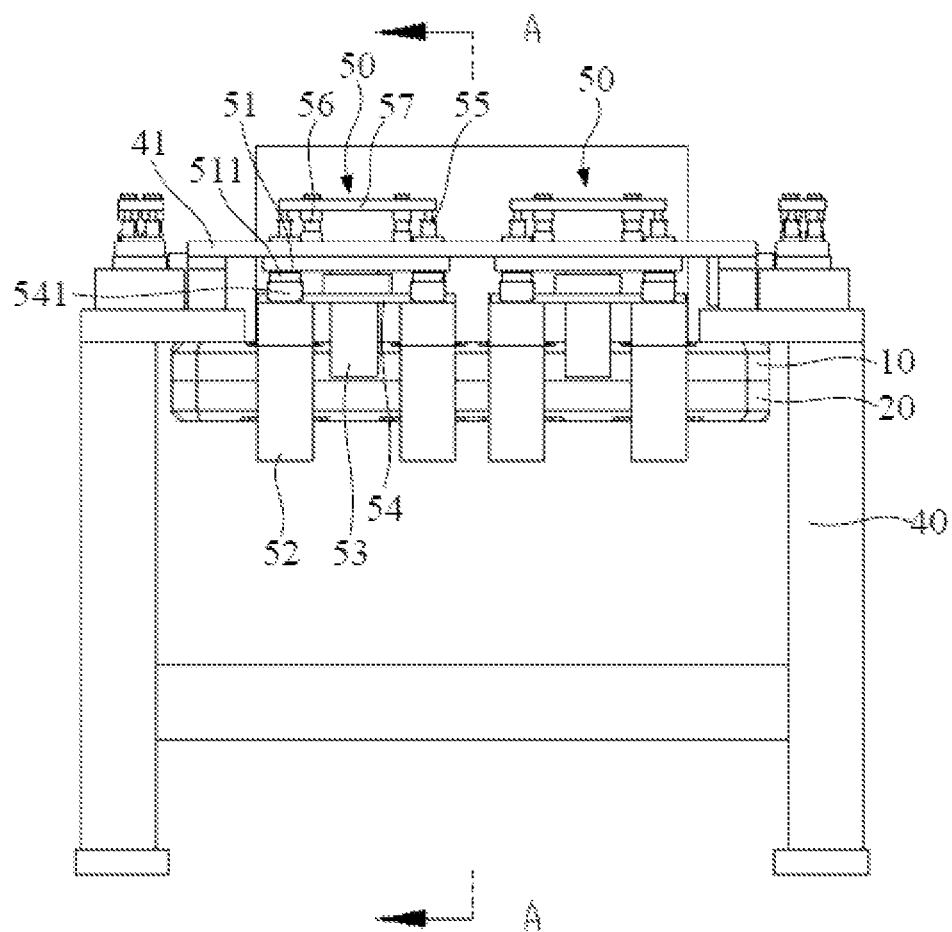
FIG. 5 is a schematic structural view of a standing device in an embodiment of the present application.
Figure 6:
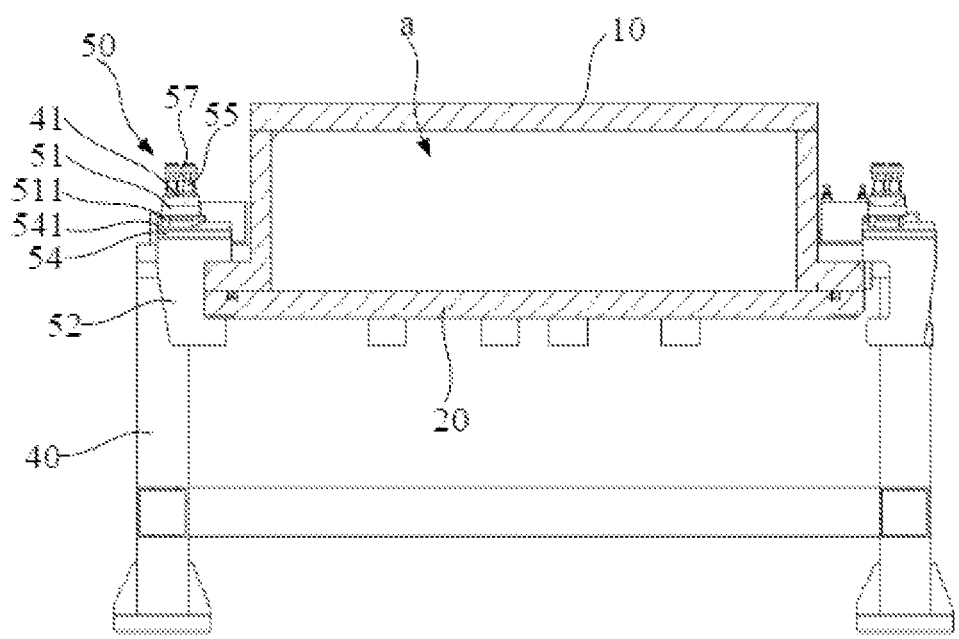
FIG. 6 is a cross-sectional view of the standing device shown in FIG. 5 along A-A direction.

As shown in FIG. 5 and FIG. 6, in an embodiment of the present application, the standing device also includes a support frame 40, a plurality of transverse support plates 41, and a plurality of clamping jaw assemblies 50. The plurality of transverse support plates 41 are fixedly connected to the support frame 40 and enclosed to form a holding position (not marked on the drawings) for accommodating the upper cover 10 and the lower cover 20, and each of the transverse support plates 41 is provided with at least one of the clamping jaw assemblies 50. Each clamping jaw assembly is used for clamping the upper cover 10 and the lower cover 20 in the holding position so that the upper cover 10 and the lower cover 20 are covered and fastened with each other. In this way, the battery after liquid injection is fixed on a fixed position of the lower cover 20, then the lower cover 20 is covered to the upper cover 10, and the upper cover 10 and the lower cover 20 are clamped by the plurality of clamping jaw assemblies 50, so that the battery can stand in the accommodating chamber a. After the battery has been finished standing, each clamping jaw assembly 50 unclamps the lower cover 20 and the upper cover 10, and then the battery is removed from the lower cover 20.

In some embodiments, each clamping jaw assembly 50 includes a mounting frame 51, clamping jaws 52, and a driving member 53. The mounting frame 51 is disposed on the transverse support plate 41, the clamping jaws 52 can be connected to the mounting frame 51 toward the holding position and in a manner of being close to or far away from the holding position. The driving member 53 is in transmission connection with the clamping jaws 52 and is used to drive the clamping jaws 52 to be close to or far away from the mounting frame 51 toward the holding position. In this way, when the clamping jaw assembly 50 is required to clamp the upper cover 10 and the lower cover 20, the driving member 53 drives the clamping jaws 52 to move close to the holding position, thereby making the clamping jaws 52 gradually close to the upper cover 10 and the lower cover 20 in the holding position until the clamping jaws 52 clamp the upper cover 10 and the lower cover 20. When it is necessary to unclamp the upper cover 10 and the lower cover 20, the driving member 53 drives the clamping jaws 52 to move away from the holding position until the clamping jaws 52 are completely separated from the upper cover 10 and the lower cover 20, thereby unclamping the upper cover 10 and the lower cover 20. Optionally, the driving member 53 may be a cylinder.

Specifically, in the embodiment, each jaw assembly 50 also includes floating structures (not marked on the drawings), the floating structures are disposed on the transverse support plate 41 and have floating ends (not marked on the drawings) that can float in the first direction perpendicular to a moving direction of the clamping jaws 52 under action of an external force. The mounting frame 51 is fixedly connected to the floating ends so that the clamping jaws 52 can float along the first direction with the floating ends. Due to processing and assembly errors of various components (such as the support frame 40), the clamping jaws 52 are not fully aligned with the upper cover 10 and the lower cover 20 in the first direction, it causes the clamping jaws 52 to fail to clamp the upper cover 10 and lower cover 20. In the present embodiment, due to arrangement of the floating structures, when the clamping jaws 52 driven by the driving member 53 move toward the upper cover 10 and the lower cover 20 in the holding position, the clamping jaws 52 can float adaptively in the first direction under action of a force generated by contacting the upper cover 10 and the lower cover 20, so as to ensure that the upper cover 10 and the lower cover 20 enter the clamping jaws 52 and are clamped by the clamping jaws 52.

Further, each transverse support plate 41 is provided with guide holes passing through the transverse support plate 41 in the first direction. Each floating structure includes a guide post 55, an elastic member 56, and a limiting member 57. The guide post 55 is arranged through the corresponding guide hole, and one end of the guide post 55 is used as the floating end and is fixedly connected to the mounting frame 51 so that the mounting frame 51 moves along the guide hole (that is, the first direction) with the guide post 55. Another end of the guide post 55 is in transmission connection with the limiting member 57, the elastic member 56 is abutted between the limiting member 57 and the transverse support plate 41 so that the elastic member 56 provides a restoring force to drive the clamping jaw 52 to reset when the clamping jaw 52 moves along the first direction with the guide post 55. Optionally, the elastic member 56 may be a spring.

Specifically, in the embodiments shown in FIG. 5 and FIG. 6, when the clamping jaws 52 are too high, the clamping jaws 52 will float downward (compress the elastic members 56) during a process of clamping the upper cover 10 and the lower cover 20, so that the upper cover 10 and the lower cover 20 enter the clamping jaws 52 and are clamped. When the clamping jaws 52 are too low, the clamping jaws 52 will float upward (the elastic member 56 extend out) during the process of clamping the upper cover 10 and the lower cover 20, so that the upper cover 10 and the lower cover 20 enter the clamping jaws 52 and are clamped.

It should be noted that each floating structure can include a plurality of guide posts 55 (that is, two or more) and a plurality of elastic members 56 (that is, two or more), which is conducive to improving the stability and reliability of the floating structure.

In some embodiments, each clamping jaw assembly 50 also includes a sliding plate 54, the clamping jaws 52 are fixedly connected to the sliding plate 54. The sliding plate 54 is provided with sliding rails 541. The mounting frame 51 is provided with sliding blocks 511, which are slidably mated with the sliding rails 541 so that the sliding rails 541 and the sliding blocks 511 can be used to guide movement of the sliding plate 54 relative to the mounting frame 51, so as to realize movement of the clamping jaws 52 close to or far away from the holding position.

Further, the driving member 53 of each clamping jaw assembly 50 is fixedly installed on the corresponding sliding plate 54, and the driving end of the driving member 53 is connected to the mounting frame 51, so as to drive the sliding plate 54 to move relative to the mounting frame 51, thereby driving the clamping jaws 52 on the sliding plate 54 to move close to or far away from the holding position.

Further, the sliding plate 54 of each clamping jaw assembly 50 is fixedly connected with a plurality of the clamping jaws 52 (that is, two or more). Preferably, two clamping jaws 52 are fixedly connected on the sliding plate 54 of each clamping jaw assembly 50, the two clamping jaws 52 are symmetrically arranged on both sides of the driving member 53 so that a force applied on the clamping jaw assembly 50 is more balanced and an operation is more stable and reliable during the process of clamping the upper cover 10 and the lower cover 20.

Figure 4:
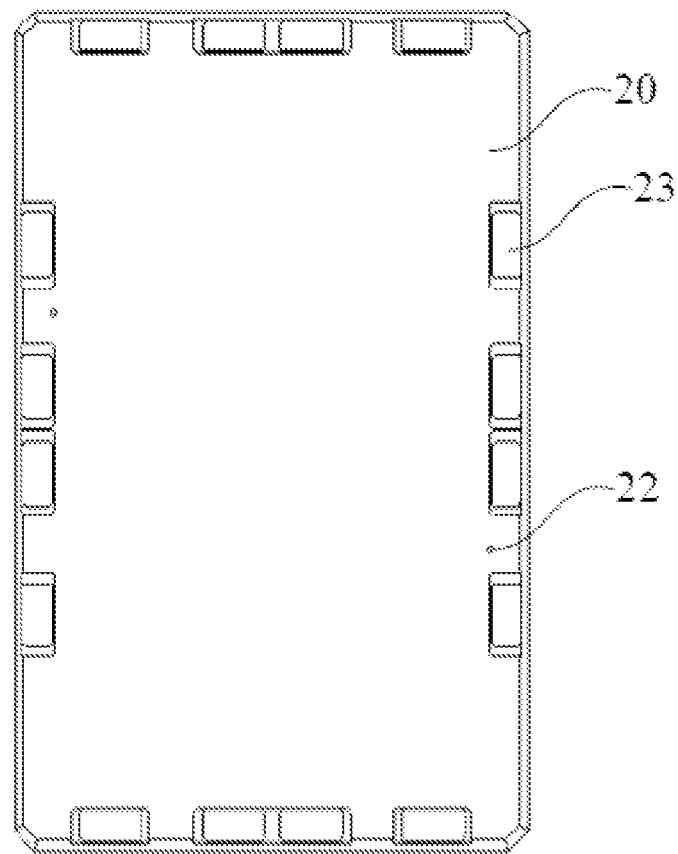
FIG. 4 is a top view of a lower cover of the sealing box shown in FIG. 1.

Specifically, in an embodiment, the upper cover 10 and the lower cover 20 are provided with anti-wear gaskets 23 (see FIG. 4) corresponding to positions of the clamping jaws 52, so that the clamping jaws 52 do not directly contact the upper cover 10 and the lower cover 20 when clamping the upper cover 10 and the lower cover 20, but contact the corresponding anti-wear gaskets 23, thereby avoiding wear of the upper cover 10 and the lower cover 20 and improving a service life.

Specifically, in the embodiments shown in FIG. 3 to FIG. 6, the upper cover 10 and the lower cover 20 are rectangular in shape, a number of transverse support plates 41 is four, and the four transverse support plates 41 are surrounded to form the rectangular holding position so as to hold the upper cover 10 and the lower cover 20. The clamping jaw assemblies 50 on the four transverse support plates 41 are respectively used to clamp four sides of the upper cover 10 and the lower cover 20. Further, each transverse support plate 41 is provided with two clamping jaw assemblies 50.

It should be noted that the standing device also includes a lower cover handling mechanism, which is used to move the lower cover 20 to the holding position and is covered with the upper cover 10 in the holding position. In this way, first, the battery after liquid injection is mounted on the fixed position of the lower cover 20. Then, the lower cover handling mechanism carries the lower cover 20 to the holding position and the lower cover 20 is covered with the upper cover 10 in the holding position. Then, the driving members 53 of the clamping jaw assemblies 50 drive the clamping jaws 52 to clamp the upper cover 10 and the lower cover 20. Specifically, the lower cover handling mechanism can be a manipulator or the like, which is not limited here.

It is understood that for ordinary skills in the art, equivalent replacements or changes can be made according to the technical solutions of the present application and their application concepts, and all these changes or replacements should belong to the protection scope of the claims attached to the present application.

The invention claimed is:

1. A standing device, wherein the standing device comprises a support frame, a plurality of transverse support plates, a plurality of clamping jaw assemblies, and a sealing box;
    wherein the plurality of the transverse support plates are fixedly connected to the support frame and enclosed to form a holding position for accommodating the upper cover and the lower cover, and each of the transverse support plates is provided with at least one of the clamping jaw assemblies for clamping the upper cover and the lower cover; and
    wherein the sealing box comprises:
    an upper cover;
    a lower cover, detachably connected to the upper cover, and enclosing with the upper cover to form an accommodating chamber for accommodating a workpiece; one side of the lower cover toward the upper cover defining a sealing groove surrounding the accommodating chamber; and
    an elastic sealing ring, sealedly disposed in the sealing groove, and comprising a sealing end sealedly contacting the upper cover and a deformation end accommodated into the sealing groove;
    wherein the lower cover defines an inflation hole communicated with the sealing groove, the deformation end is deformed under force of airflow inflated into the sealing groove by the inflation hole, thereby squeezing groove walls of the sealing groove and generating a force to push the sealing end to move toward the upper cover.

2. The standing device as claimed in claim 1, wherein each clamping jaw assembly comprises a mounting frame, clamping jaws, and a driving member, the mounting frame is disposed on the transverse support plate, the clamping jaws is adaptable to connected to the mounting frame toward the holding position close to or far away from the holding position, and the driving member is in transmission connection with the clamping jaws.

3. The standing device as claimed in claim 2, wherein each clamping jaw assembly comprises floating structures, the floating structures are disposed on the transverse support plate and have floating ends adaptable to float in a first direction perpendicular to a moving direction of the clamping jaws under an external force;
    the mounting frame is fixedly connected to the floating ends.

4. The standing device as claimed in claim 3, wherein each transverse support plate defines guide holes that pass through the transverse support plate in the first direction;
    each floating structure comprises a guide post, an elastic member, and a limiting member, the guide post is arranged through the corresponding guide hole, and a first end of the guide post is used as the floating end and is fixedly connected to the mounting frame, a second end of the guide post is in transmission connection with the limiting member, and the elastic member is butted between the limiting member and the transverse support plate.

5. The standing device as claimed in claim 2, wherein each clamping jaw assembly further comprises a sliding plate, the clamping jaws are fixedly connected to the sliding plate, and the sliding plate is provided with sliding rails;
    the mounting frame is provided with sliding blocks, and the sliding blocks are slidably mated with the sliding rails;
    the driving member is fixedly installed on the sliding plate, and a driving end of the driving member is connected to the mounting frame.

6. The standing device as claimed in claim 5, wherein a plurality of the clamping jaws are fixedly connected on the sliding plate of each clamping jaw assembly.

7. The standing device as claimed in claim 2, wherein the upper cover and the lower cover are provided with anti-wear gaskets corresponding to positions of the clamping jaws.

8. The standing device as claimed in claim 1, wherein the deformation end defines a recess having two sides, and the deformation end comprises two elastic portions each of which is on one side of the recess respectively, the inflation hole is arranged toward the recess, the two elastic portions fit closely against the groove walls of the sealing groove under force of the airflow inflated into the recess by the inflation hole.

9. The standing device as claimed in claim 1, wherein portions of the elastic sealing ring accommodated in the sealing groove fit against the groove walls of the sealing groove.

* * * * *